United States Patent
Kung et al.

(10) Patent No.: US 12,025,295 B2
(45) Date of Patent: Jul. 2, 2024

(54) WEARABLE DEVICE AND HEAD STRAP MODULE

(71) Applicant: HTC Corporation, Taoyuan (TW)

(72) Inventors: Tsen-Wei Kung, Taoyuan (TW); Chung-Ju Wu, Taoyuan (TW); Tsung Hua Yang, Taoyuan (TW); Chih-Yao Chang, Taoyuan (TW); Wei Te Tu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 232 days.

(21) Appl. No.: 17/872,014

(22) Filed: Jul. 25, 2022

(65) Prior Publication Data

US 2023/0280020 A1   Sep. 7, 2023

Related U.S. Application Data

(60) Provisional application No. 63/316,412, filed on Mar. 4, 2022.

(51) Int. Cl.
*F21V 21/084*   (2006.01)
(52) U.S. Cl.
CPC .................................. *F21V 21/084* (2013.01)
(58) Field of Classification Search
CPC .. G02B 27/0176; F16M 13/04; F16M 11/041; F21V 21/084
See application file for complete search history.

(56) References Cited

U.S. PATENT DOCUMENTS

| 5,321,416 A | * | 6/1994 | Bassett | A42B 3/145 |
| | | | | 348/121 |
| 8,540,363 B2 | | 9/2013 | Abreu | |
| 2019/0056590 A1 | | 2/2019 | Chuang et al. | |

FOREIGN PATENT DOCUMENTS

| TW | M527552 | 8/2016 |
| TW | 202037967 | 10/2020 |
| TW | 202101061 | 1/2021 |
| TW | 202119959 | 6/2021 |

OTHER PUBLICATIONS

"Office Action of Taiwan Counterpart Application", issued on Mar. 6, 2023, pp. 1-9.
Meta, "Meta Quest 2 Elite Strap", retrieved from "https://www.oculus.com/accessories/quest-2-elite-strap/".

* cited by examiner

*Primary Examiner* — Anne M Hines
(74) *Attorney, Agent, or Firm* — JCIPRNET

(57) ABSTRACT

A wearable device and a head strap module are provided. The wearable device includes a host and a head strap module. Two opposite sides of the host are provided with a first bracket and a second bracket. The first bracket has a first end. The second bracket has a second end. The head strap module includes a first belt, a second belt, and an adjustment mechanism. The first belt has a third end. The second belt has a fourth end. The third end and the fourth end are detachably assembled to the first end and the second end respectively. The adjustment mechanism is arranged at the overlapping position of the first belt and the second belt for adjusting the overlapping length of the first belt and the second belt.

11 Claims, 4 Drawing Sheets

WEARABLE DEVICE AND HEAD STRAP MODULE

CROSS-REFERENCE TO RELATED APPLICATION

This application claims the priority benefit of U.S. provisional application Ser. No. 63/316,412, filed on Mar. 4, 2022. The entirety of the above-mentioned patent application is hereby incorporated by reference herein and made a part of this specification.

BACKGROUND

Technical Field

The invention relates to a device and a head strap module, and in particular, relates to a wearable device and a head strap module.

DESCRIPTION OF RELATED ART

With the advancement of the technology industry, the types, functions, and ways of use of display devices are becoming more and more diverse, and wearable display devices that can be directly worn on a user's body have hit the market accordingly. Head-mounted display devices come in many types. Taking glasses-type head-mounted display devices as an example, after a user wears such a display device, the user may see a three-dimensional image, and such an image will change as the user's head moves, providing the user with an immersive experience.

However, when the glasses-type head-mounted display device is used for playing games, if the user performs vigorous movements, the temples may not be able to provide sufficient clamping force, and the device may fall off easily.

SUMMARY

The invention provides a wearable device and a head strap module capable of improving the problem of poor operation experience and the problem of device falling off easily.

The invention provides a wearable device including a host and a head strap module. Two opposite sides of the host are provided with a first bracket and a second bracket. The first bracket has a first end. The second bracket has a second end. The head strap module includes a first belt, a second belt, and an adjustment mechanism. The first belt has a third end. The second belt has a fourth end. The third end and the fourth end are detachably assembled to the first end and the second end respectively. The adjustment mechanism is arranged at the overlapping position of the first belt and the second belt for adjusting the overlapping length of the first belt and the second belt.

The invention further provides a head strap module applied to a wearable device. The head strap module includes a first belt, a second belt, and an adjustment mechanism. The first belt has a third end. The second belt has a fourth end. The third end and the fourth end are configured to be detachably assembled to a first end of a first bracket of a host of the wearable device and a second end of a second bracket of the host. The adjustment mechanism is arranged at the overlapping position of the first belt and the second belt for adjusting the overlapping length of the first belt and the second belt.

To sum up, in the wearable device and the head strap module provided by the invention, after the head strap module and the host are detachably connected, the wearable device may be stably secured on the user's body and may not fall off easily.

DESCRIPTION OF THE EMBODIMENTS

Figure 1:
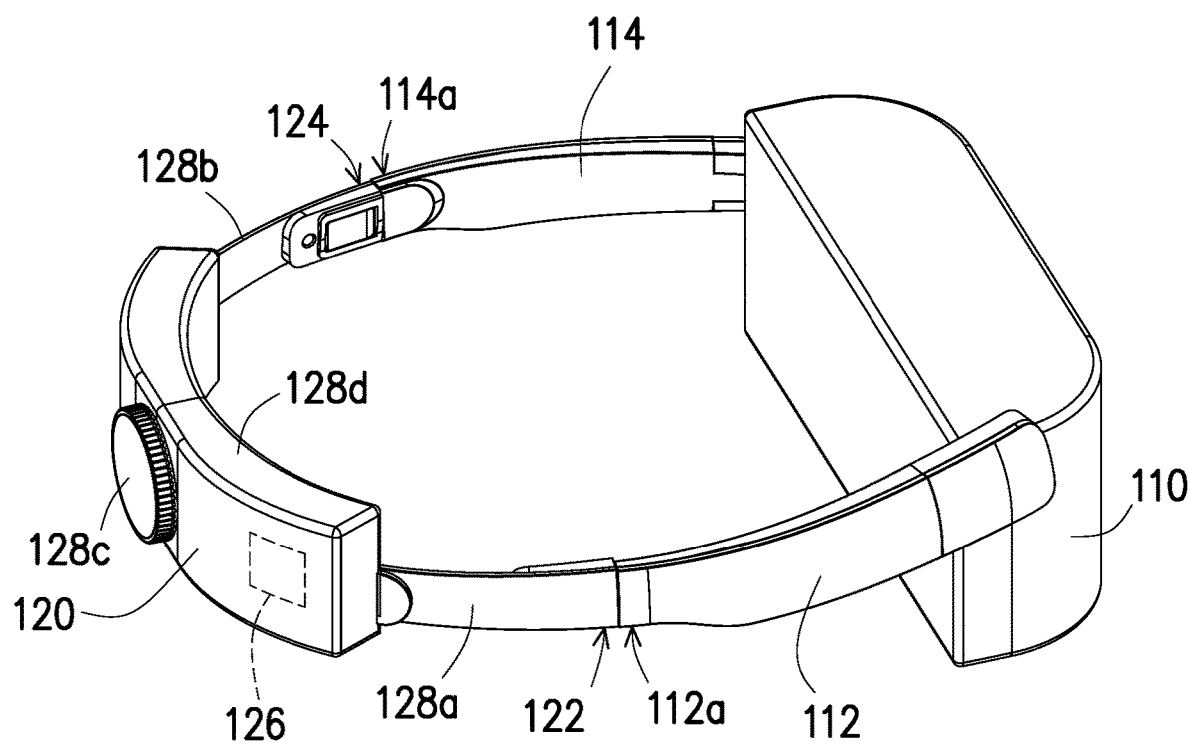
FIG. 1 is a schematic view of an assembled state of a wearable device according to an embodiment of the invention.
Figure 2:
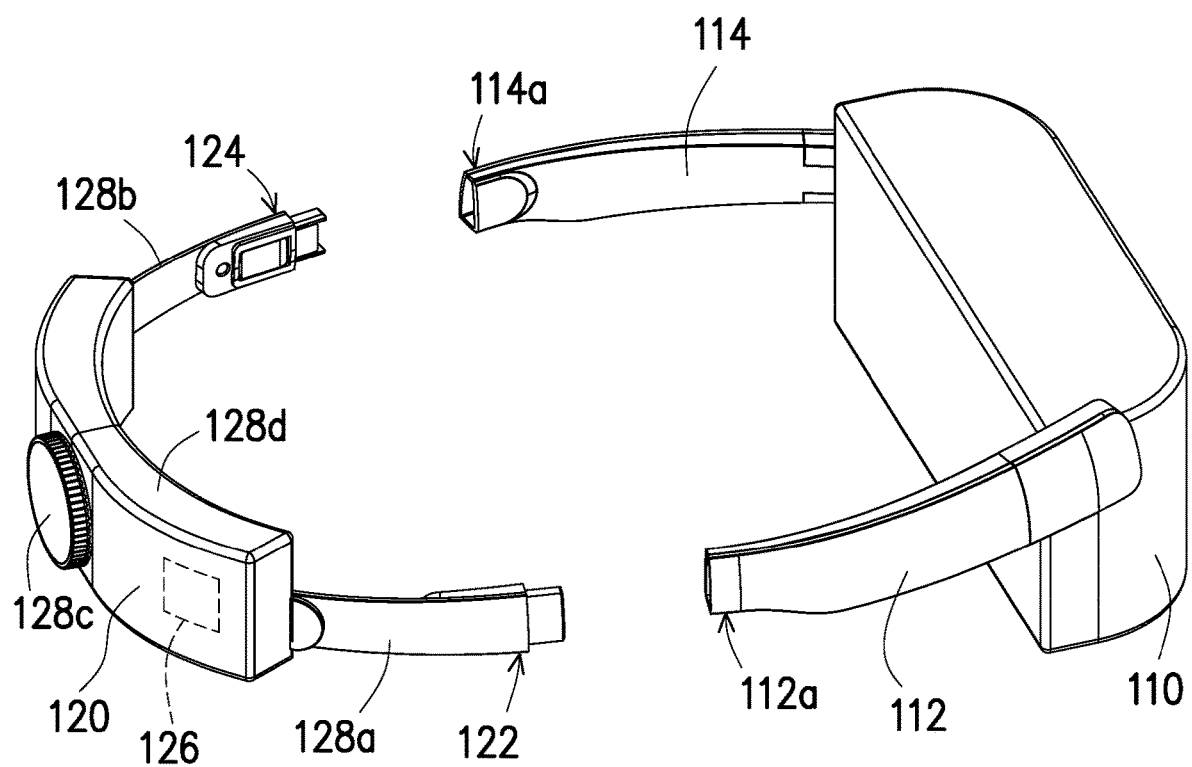
FIG. 2 is a schematic view of a disassembled state of the wearable device of FIG. 1.

FIG. 1 is a schematic view of an assembled state of a wearable device according to an embodiment of the invention. FIG. 2 is a schematic view of a disassembled state of the wearable device of FIG. 1. With reference to FIG. 1 and FIG. 2, a wearable device 100 provided by this embodiment includes a host 110 and a head strap module 120. Two opposite sides of the host 110 are provided with a first bracket 112 and a second bracket 114. The first bracket 112 has a first end 112*a*. The second bracket 114 has a second end 114*a*. An opposite third end 122 and a fourth end 124 of the head strap module 120 are detachably connected to the first end 112*a* and the second end 114*a*, respectively.

In this embodiment, a detachable design is adopted between the host 110 and the head strap module 120. After the host 100 and the head strap module 120 are combined, even if a user performs vigorous movements, the wearable device 100 may still be stably secured on the user's head or other objects, and there is no need to worry about the device falling off or being damaged.

In this embodiment, the head strap module 120 includes a first belt 128*a*, a second belt 128*b*, and an adjustment mechanism 128*c*. The first belt 128*a* has a third end 122. The second belt 128*b* has a fourth end 124. The third end 122 and the fourth end 124 are detachably assembled to the first end 112*a* and the second end 114*a* respectively. The adjustment mechanism 128*c* is arranged at the overlapping position of the first belt 128*a* and the second belt 128*b* for adjusting the overlapping length of the first belt 128*a* and the second belt 128*b*. The distance between the third end 122 and the fourth end 124 is adjustable. That is, after the host 110 and the head strap module 120 are combined, by adjusting the overlapping length of the first belt 128*a* and the second belt 28*b*, users with different body shapes may wear the wearable device 100 comfortably and stably. The head strap module 120 provided by this embodiment may further include a housing 128*d*. The overlapping position of the first belt 128*a* and the second belt 128*a* is located in the housing 128*d*. The adjustment mechanism 128*c* is arranged at the housing 128*d*.

In this embodiment, the head strap module 120 has, for example, a battery 126 electrically connected to host 110. The host 110 itself may have a battery, but such a design may increase the weight of the host 110 at the same time. Alternatively, the host 110 may be connected an external power supply, such as a computer or a mobile power supply, through a wire. However, the user's operating experience may be affected due to the wire. Under the structure that the head strap module 120 is provided with the battery 126, the wearable device 100 is not required to be connected to an external power source, so when the user uses the wearable device 100, the movement of the user is prevented from being restricted. Moreover, such a structure also balances the weight of the wearable device 100 on the user's head, and good operational stability is also provided.

Figure 3:
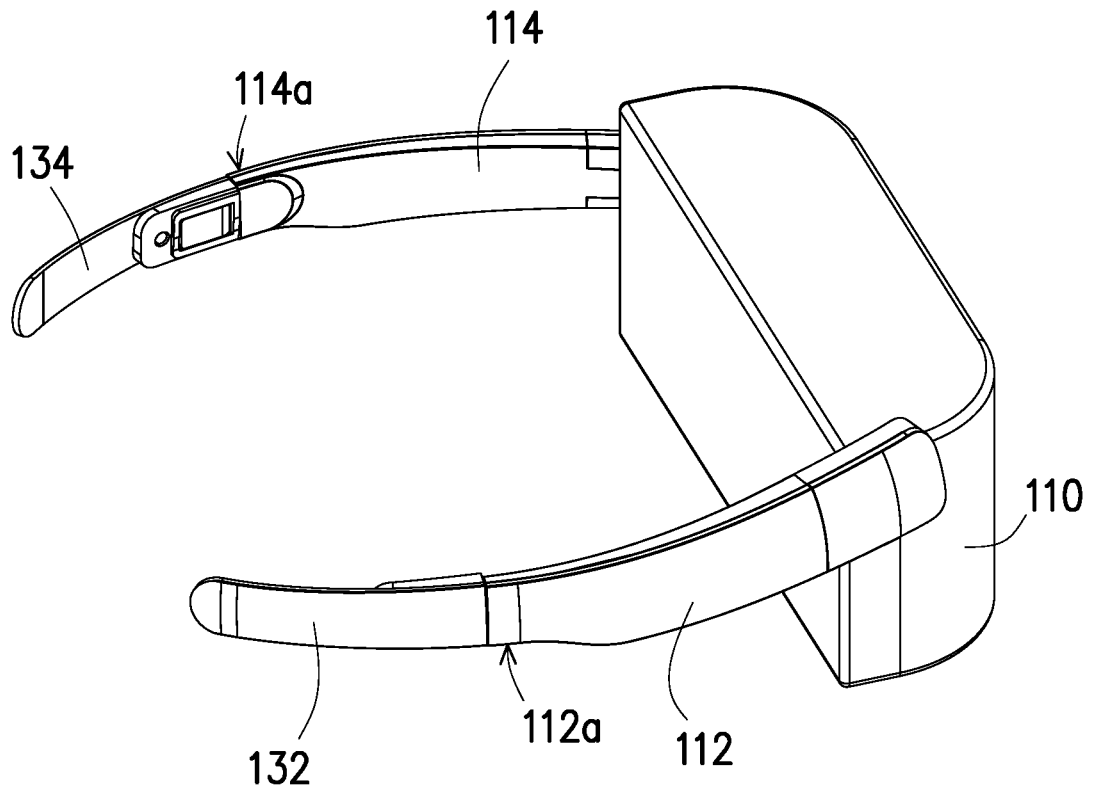
FIG. 3 is a schematic view of another assembled state of the wearable device of FIG. 1.

FIG. 3 is a schematic view of a connected state of the wearable device of FIG. 1 at a connection position. With reference to FIG. 2 and FIG. 3, when the user is watching static activities such as videos, the wearable device 100 provided by this embodiment may further include a first extension member 132 and a second extension member 134. The first extension member 132 is adapted to be detachably assembled to the first end 112a. The second extension member 134 is adapted to be detachably assembled to the second end 114a. The first extension member 132 and the second extension member 134 are independent of each other. After the head strap module 120 is separated from the host 110, the first extension member 132 is connected to the first end 112a, and the second extension member 134 is connected to the second end 114a. The first extension member 132 and the second extension member 134 in this embodiment are configured for extending as support brackets, so that the wearable device 100 may be stably supported on the user's head or other objects. In other words, the functions of the first extension member 132 and the second extension member 134 are more like temples of glasses. In other embodiments, the first bracket 112 and the second bracket 114 of the host 110 may also be connected to other expanded functional elements, so the wearable device 100 has greater convenience in use. Therefore, after the head strap module 120 is detached from the wearable device 100, the user may also assemble the first extension member 132 and the second extension member 134 to the host 110, so as to enjoy a lighter use experience.

In this embodiment, the host 110 is a head-mounted display and may be applied to fields such as virtual reality systems, augmented reality systems, or mixed reality systems, for example. The host 110 may include an optical system and members such as a protective housing and may be provided with a display or may be suitable for allowing a display to be placed. The aforementioned display may be a built-in display or an external portable display (such as a smart phone, etc.), but the invention is not limited thereto. The optical system includes optical elements for changing the optical path of the display, such as lenses, light guides, or prisms. The host 110 in FIG. 1 is shown in a larger size, but the host 110 may also be in a shape similar to glasses or other shapes.

Figure 4:
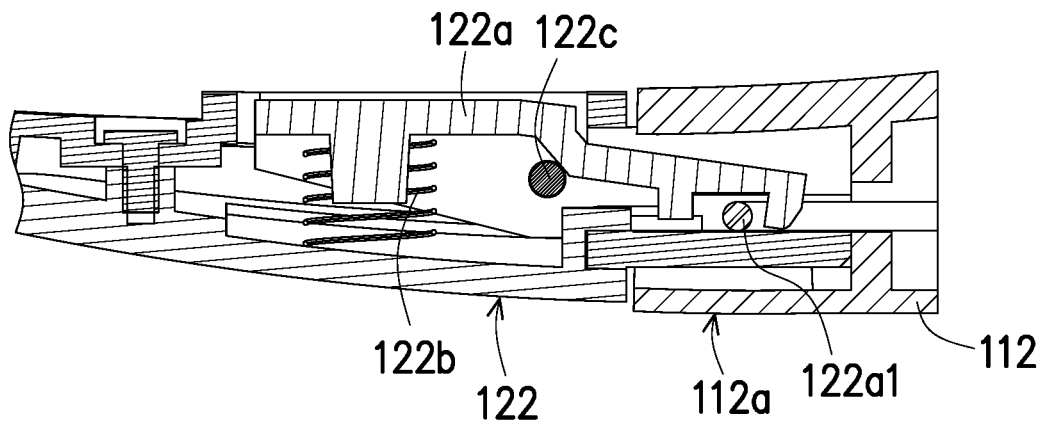
FIG. 4 is a schematic view of a connected state of the wearable device of FIG. 1 at a connection position.
Figure 5:
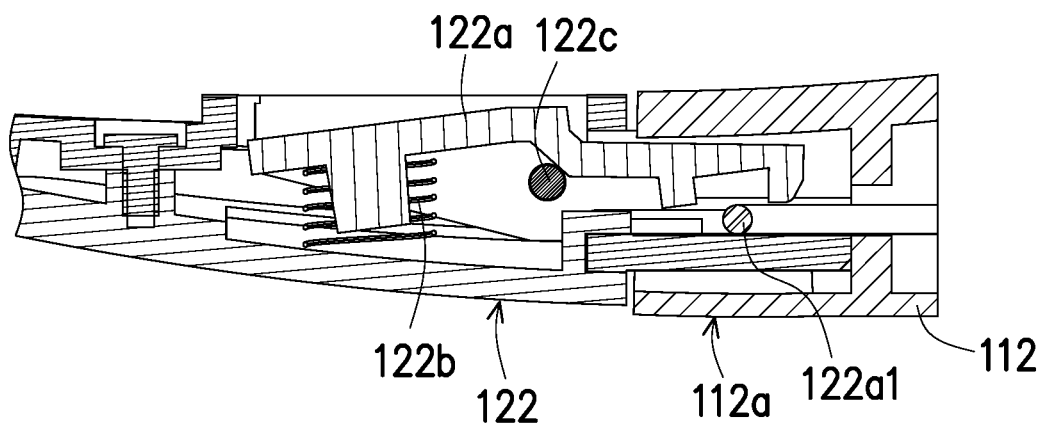
FIG. 5 is a schematic view of a disconnected state of the wearable device of FIG. 1 at the connection position.

FIG. 4 is a schematic view of a connected state of the wearable device of FIG. 1 at a connection position. FIG. 5 is a schematic view of a disconnected state of the wearable device of FIG. 1 at the connection position. With reference to FIG. 4 and FIG. 5, in this embodiment, the first end 112a has a hook 112a1. The third end 122 has a buckle 122a, and the buckle 122a is configured to buckle the hook 112a1. In FIG. 4, the buckle 122a buckles the hook 112a1, so that the first bracket 112 of the host 110 is firmly connected to the third end 122 of the head strap module 120. In FIG. 4, the buckle 122a is separated from the hook 112a1, so that the first bracket 112 of the host 110 may be detached from the third end 122 of the head strap module 120. In this embodiment, the buckle 122a and the hook 112a1 are both hidden in the housings of the first end 112a and the third end 122 and may be properly protected.

In this embodiment, the third end 122 may be further provided with a restoring member 122b for applying an elastic restoring force to the buckle 122a, so that the buckle 122a is restored to the position where the hook 122a1 is buckled after being moved away from the position where the hook 122a1 is buckled. When the buckle 122a buckles the hook 112a1 as shown in FIG. 4, the side of the buckle 122a away from the hook 112a1 is pressed, and due to the action of a post 122c, the side of the buckle 122a that is buckled to the hook 112a1 is lifted up and separated from the hook 112a1, as shown in FIG. 5 Therefore, the first bracket 112 of the host 110 may be detached from the third end 122 of the head strap module 120. With such a design, the user does not need additional tools to remove the head strap module 120, and the hook 112a1 may also secure the head strap module 120 stably, so that the space is optimized and the overall size is effectively reduced.

When the buckle 122a is separated from the hook 112a1 as shown in FIG. 5, the downward pressure applied on the side of the buckle 122a away from the buckled hook 112a1 is released, and the restoring member 122b may exert an elastic restoring force on the buckle 122a. Due to the action of the post 122c, the side of the buckle 122a close to the hook 112a1 may be automatically pressed down to buckle the main hook 112a1 again, as shown in FIG. 4. Therefore, the first bracket 112 of the host 110 may be firmly connected to the third end 122 of the head strap module 120.

In view of the foregoing, in the wearable device and the head strap module provided by the invention, the head strap module and the host are detachably connected, so that the wearable device may be stably secured on the user's body when necessary and may not fall off easily. The user may easily and conveniently remove the head strap module, and it thus can be seen that the head strap module exhibits convenience and may be adapted to be used in different scenarios such as static activities or vigorous activities. Further, when the head strap module is equipped with a battery, the head strap module may be conveniently operated, and the balanced weight at the same time provides the user with good operation stability, so the user's operation experience is not affected because a charging cable is not required. In addition, when the buckle and the hook are used together, the connection and separation of the host and the head strap module may be easily completed.

What is claimed is:

1. A wearable device, comprising:
   a host, having a first bracket and a second bracket on two opposite sides thereof, wherein the first bracket has a first end, and the second bracket has a second end;
   a head strap module, comprising:
      a first belt, having a third end;
      a second belt, having a fourth end, wherein the third end and the fourth end are detachably assembled to the first end and the second end respectively; and
      an adjustment mechanism, arranged at the overlapping position of the first belt and the second belt for adjusting the overlapping length of the first belt and the second belt.

2. The wearable device according to claim 1, wherein the first end has a hook, the third end has a buckle, and the buckle is configured to buckle the hook.

3. The wearable device according to claim 2, wherein the third end is provided with a restoring member for applying an elastic restoring force to the buckle, so that the buckle is restored to the position where the hook is buckled after being moved away from the position where the hook is buckled.

4. The wearable device according to claim 1, wherein the head strap module further comprises a battery electrically connected to the host.

5. The wearable device according to claim 1, wherein the distance between the third end and the fourth end is adjustable.

6. The wearable device according to claim 1, further comprising a first extension member and a second extension member, the first extension member is adapted to be detachably assembled to the first end, the second extension member is adapted to be detachably assembled to the second end, and the first extension member and the second extension member are independent of each other.

7. The wearable device according to claim 1, wherein the head strap module further comprises a housing, the overlapping position of the first belt and the second belt is located in the housing, and the adjustment mechanism is arranged at the housing.

8. A head strap module, applied to a wearable device, the head strap module comprising:
 a first belt, having a third end;
 a second belt, having a fourth end, wherein the third end and the fourth end are configured to be detachably assembled to a first end of a first bracket of a host of the wearable device and a second end of a second bracket of the host; and
 an adjustment mechanism, arranged at the overlapping position of the first belt and the second belt for adjusting the overlapping length of the first belt and the second belt.

9. The head strap module according to claim 8, further comprising a battery, configured to be electrically connected to the host.

10. The head strap module according to claim 8, wherein the distance between the third end and the fourth end is adjustable.

11. The head strap module according to claim 8, further comprising a housing, the overlapping position of the first belt and the second belt is located in the housing, and the adjustment mechanism is arranged at the housing.

* * * * *